(12) United States Patent
Laing

(10) Patent No.: US 8,313,294 B2
(45) Date of Patent: Nov. 20, 2012

(54) CIRCULATING PUMP

(75) Inventor: Karsten Laing, Althütte (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 45 days.

(21) Appl. No.: 12/913,991

(22) Filed: Oct. 28, 2010

(65) Prior Publication Data

US 2011/0091320 A1 Apr. 21, 2011

Related U.S. Application Data

(63) Continuation of application No. PCT/EP2009/055078, filed on Apr. 27, 2009.

(30) Foreign Application Priority Data

May 5, 2008 (DE) .......................... 10 2008 023 574

(51) Int. Cl.
*F04D 29/046* (2006.01)
(52) U.S. Cl. ...................... 415/229; 415/216.1; 415/112; 415/119
(58) Field of Classification Search .................. 415/180, 415/60, 62, 229, 97, 99, 216.1, 112, 119; 416/120, 124, 175, 174; 417/423.8, 423.11, 417/423.12, 423.13
See application file for complete search history.

(56) References Cited

U.S. PATENT DOCUMENTS

| 4,072,446 | A | * | 2/1978 | Walker | 417/420 |
| 4,293,170 | A | * | 10/1981 | Brezosky | 384/275 |
| 7,101,157 | B2 | * | 9/2006 | Bamberger et al. | 417/368 |
| 2006/0285985 | A1 | | 12/2006 | Laing | |

FOREIGN PATENT DOCUMENTS

| DE | 24 24 552 | 1/1975 |
| DE | 87 16 971 U1 | 4/1989 |
| DE | 202 17 109 U1 | 4/2004 |
| EP | 1 593 852 A2 | 11/2005 |
| GB | 1 420 840 | 1/1976 |

* cited by examiner

*Primary Examiner* — Ninh H Nguyen
*Assistant Examiner* — Adam W Brown
(74) *Attorney, Agent, or Firm* — RatnerPrestia

(57) ABSTRACT

In order to provide a circulating pump, comprising a stator, a rotor, a bearing device with a convex bearing member and at least one concave bearing shell, via which the rotor is mounted for rotation, and an impeller which is connected non-rotatably to the rotor, which has improved lubrication possibilities and/or with which any axial lifting of the impeller can be prevented in an effective manner, it is provided for a shaft element to be connected non-rotatably to the rotor and non-rotatably to the impeller and for the shaft element to be guided through the bearing member and to be rotatable relative to the bearing member.

40 Claims, 11 Drawing Sheets

CIRCULATING PUMP

This application is a continuation of international application number PCT/EP2009/055078 filed on Apr. 27, 2009.

The present disclosure relates to the subject matter disclosed in international application number PCT/EP2009/055078 of Apr. 27, 2009 and German application number 10 2008 023 574.1 of May 5, 2008, which are incorporated herein by reference in their entirety and for all purposes.

BACKGROUND OF THE INVENTION

The invention relates to a circulating pump, comprising a stator, a rotor, a bearing device with a convex bearing member and at least one concave bearing shell, via which the rotor is mounted for rotation, and an impeller which is connected non-rotatably to the rotor.

EP 1 593 852 A2 discloses a circulating pump and a method for the fluid lubrication of a spherical bearing in an electric motor. The circulating pump comprises an electric motor which has a rotor and a stator, wherein the rotor is mounted on a spherical bearing which has a sliding member with a convex, spherical surface and a bearing pan with a concave, spherical surface and which is lubricated by fluid. A flow guide for conducting lubricating fluid through a lubrication area between the sliding member and the bearing pan is separate from a gap between stator and rotor.

A bearing device with a convex bearing member and a concave bearing shell (bearing pan), which have respective spherical surfaces which face one another, is also designated as a spherical bearing.

SUMMARY OF THE INVENTION

In accordance with an embodiment of the invention a circulating pump is provided which has a reduced flow through the gap between rotor and stator and/or with which any axial lifting of the impeller can be prevented in an effective manner.

In accordance with an embodiment of the invention, in a circulating pump a shaft element is connected non-rotatably to the rotor and non-rotatably to the impeller and the shaft element is guided through the bearing member and can be rotated relative to the bearing member.

As a result of the provision of an additional shaft element which connects the impeller to the rotor, the rotor can, with respect to flow, be decoupled from a flow in an impeller chamber. In this case, a flow of fluid to be pumped through a gap of air at the rotor is no longer necessary to effect fluid lubrication of the bearing device. As a result, on the other hand, magnetic particles, which can be contained in the fluid to be pumped, may be prevented from reaching the rotor and being able to settle thereon. The depositing of magnetic particles on the rotor can lead to a seizing of the circulating pump.

As a result of the provision of the shaft element, it is, in principle, also possible to bring about the sliding mounting of the spherically concave bearing shell on the bearing member (sliding member), which is spherically convex at least in sections, outside the rotor. As a result, the rotor can be of a more simple configuration.

It is also possible, as a result, to provide a bearing device which is supported on the bearing member in two directions via two bearing shells.

The bearing member has, in particular, a (continuous) recess, in which the shaft element is (rotatably) positioned. The recess is, for example, a cylindrical recess which extends between oppositely located pole areas of the bearing member.

When the convex bearing member is of a spherical design, the recess is preferably aligned coaxially to a direction of the diameter, wherein this direction of the diameter is preferably at right angles to an equatorial plane of the bearing member.

The shaft element has, in particular, a greatest external diameter which is smaller than a smallest internal diameter of the recess. A gap is formed between the shaft element and walls of the recess which makes a free rotatability in the recess possible. It has proven to be favorable when the width of the gap is at least 0.5 mm.

It is favorable when the shaft element has a recessed area with a reduced diameter in the region of an exit area through the recess. For example, the shaft element has an annular recess. As a result, the shaft element is prevented from striking an edge of the bearing member which is formed by the recess. Such edges are, particularly when the convex bearing member is a ceramic element, generally very sensitive to impact. When the shaft element tilts in the recess, the shaft element meets the wall of the recess outside the edge and cannot strike the edge. Such recessed areas are formed by the recess, in particular, at the oppositely located exit areas; in this respect, one exit area is located in an impeller chamber and the other exit area is located in a rotor chamber. It is also possible for the width of a gap between the shaft element and a recess in the bearing member to be so large that the shaft element does not touch the bearing member even with a maximum tilting of the impeller. In this case, the rotor strikes "outside" before the shaft element strikes.

The shaft element is preferably designed to be cylindrical in at least one section, with which it is guided through the bearing member. As a result, the recess may be produced in a simple manner.

It is favorable when the bearing member is arranged between a bearing shell, which is fixed to the impeller, and a fixing area of the shaft element on the rotor. As a result, a non-rotatable connection between the rotor and the impeller may be realized in a simple manner, wherein the impeller is then mounted directly on the bearing member and the rotor is, on the other hand, mounted "indirectly" on the bearing member via the connection. In addition, it is also possible for the rotor to also be slidingly mounted directly on the bearing member via an additional bearing shell.

It is particularly advantageous when the bearing member is held non-rotatably by a holder which is arranged above the rotor facing the impeller. The holder may be fixed in position with respect to a housing of the circulating pump in a simple manner. It can, at the same time, be used as a separating element in order to separate a rotor chamber from an impeller chamber, for example, in a fluid-tight manner or at least separate them in such a manner that larger magnetic particles cannot pass into the rotor chamber.

It is particularly advantageous when a rotor chamber is provided, in which the rotor is arranged so as to be rotatable, and an impeller chamber is provided, in which the impeller is arranged so as to be rotatable, wherein the rotor chamber and the impeller chamber are separated from one another by a separating element. The separating element separates the rotor chamber from the impeller chamber in such a manner that no magnetic particles of a minimum size can pass into the rotor chamber. This can be achieved, for example, in that the separating element separates the rotor chamber from the impeller chamber in a completely fluid-tight manner. It is, however, also possible, in principle, for an exchange of fluid to be possible between the impeller chamber and the rotor chamber, wherein corresponding exchange openings must then have a diameter which does not allow magnetic particles of a "critical size" to pass into the rotor chamber.

It is favorable when the separating element is arranged at the level of the bearing member and, in particular, is arranged in such a manner that it holds the bearing member for the purpose of fixing it in position at or in the vicinity of an equatorial plane. As a result, a relatively large, spherical area is provided on the bearing member as a sliding surface for the spherical, concave bearing shell. It is then also possible, in principle, for a bearing shell, which slides on the bearing member, to be arranged on the rotor itself, in addition.

It is favorable when the separating element is designed as a holder for the bearing member. As a result, the number of components which are required for the construction of the circulating pump can be kept low. As a result of the separating element, the impeller chamber may be separated from the rotor chamber and the bearing member is fixed in position by the separating element at the same time.

It is favorable when a bearing shell (which is spherically concave), which is connected non-rotatably to the impeller and which is mounted on the bearing member, is arranged between the separating element and the impeller with respect to an axial direction. This results in a simple construction and advantageous lubrication possibilities may be realized.

The separating element decouples the rotor chamber from a lubrication chamber of the bearing device, through which fluid for the lubrication is transported during operation of the circulating pump and so, at least not directly, fluid to be pumped can flow from the lubrication chamber into the rotor chamber and a flow circuit is thereby formed. As a result, no magnetic particles can pass into the rotor chamber via the lubrication chamber.

In this respect, it is possible for the separating element to be designed to be fluid-tight or have at the most one or more openings between the impeller chamber and the rotor chamber, the diameter of which is at the most 0.3 mm. When the separating element is designed to be completely fluid-tight, no exchange of fluid can take place between the impeller chamber and the rotor chamber, i.e. no fluid to be pumped can pass into the rotor chamber and, therefore, no magnetic particles, which are contained in the fluid to be pumped, can pass into the rotor chamber. In principle, a flow of fluid in the rotor chamber can be desirable in order to be able to discharge heat more effectively. The discharge of heat takes place by way of a transfer of heat to fluid to be pumped in the impeller chamber. It may then be desirable to form a flow of fluid in the rotor chamber. When fluid is to be filled into the rotor chamber (first filling) from the impeller chamber, magnetic particles of a critical size must be prevented from reaching the rotor chamber as a result of a correspondingly small design of the at least one opening. When the diameter of a corresponding opening is at the most 0.3 mm, this penetration of magnetic particles into the rotor chamber can be prevented in an effective manner.

It is advantageous when the separating element has a rib structure. The rib structure can face the impeller chamber and/or the rotor chamber. The surface area of the separating element is increased as a result of the rib structure. As a result, the surface area, via which a transfer of heat can take place, is increased. A more effective cooling action can then be achieved. A rib structure can also increase the rigidity of the separating element. As a result, the characteristic frequency spectrum of the rotating system can be modulated. As a result of a rib structure which is designed accordingly, the characteristic frequency spectrum can, in particular, be modulated such that a lowest characteristic frequency is below and, in particular, far below 600 Hz.

In one embodiment, at least one seal is arranged between the separating element and a separating cap which surrounds the rotor. Such a seal is provided, in particular, when the separating element is designed to be fluid-tight in order to screen off the rotor chamber completely from the impeller chamber with respect to the penetration of fluid. As a result, a closed rotor chamber is provided, wherein no exchange of fluid with the impeller chamber is possible.

It is then favorable when the rotor chamber is previously filled with fluid. For example, a prior filling with a mixture of water and glycol is provided. This fluid serves as a heat transfer fluid for the more effective discharge of heat from the stator as primary heat source via the rotor to the impeller chamber.

In one embodiment, a lubrication chamber for the bearing device is separated with respect to fluid from an impeller chamber, in which the impeller rotates. The lubrication chamber is then coupled to the rotor chamber. The rotor chamber is, as a result, a reservoir for lubricant. No fluid to be pumped is then used as lubrication fluid. Instead of this, an internal lubricant circuit is provided. As a result, an effective lubrication of the bearing device can be achieved even in the case of abrasive fluids to be pumped.

It is provided, in particular, for the shaft element to have at least one channel, via which fluid can flow from the lubrication chamber to the rotor chamber, in which the rotor rotates. The shaft element has, in particular, a corresponding hollow channel in order to make this possible. Lubricant fluid from the rotor chamber can then be used to lubricate the corresponding bearing device. This is separated from the impeller chamber with respect to fluid so that the penetration of abrasive particles into the lubrication chamber is prevented, wherein an effective fluid lubrication of the bearing device is ensured.

The at least one bearing shell is, in particular, sealed in the direction of the impeller chamber in order to prevent the penetration of fluid to be pumped into the lubrication chamber and, therefore, also into the rotor chamber.

The at least one bearing shell advantageously has channels, via which fluid which flows around the shaft element through a gap at the bearing member can be supplied to the at least one channel of the shaft element. As a result, a circuit for a stream of lubricant between the rotor chamber and the lubrication chamber is made possible in order to bring about an effective fluid lubrication of the bearing device.

It is, in addition, favorable when a friction pump is formed by the rotor which rotates in a rotor chamber and this friction pump drives a flow of lubricant through the lubrication chamber. This friction pump generates the necessary difference in pressure to drive lubricant from the rotor chamber through the lubrication chamber at the bearing device.

In one embodiment, a holder for the bearing member is mounted on a modulating element for the characteristic frequencies of the rotating system. This modulating element provides for a decoupling of vibration. It is designed, for example, as a rubber bearing. A characteristic frequency spectrum can be modulated by a corresponding selection. On the other hand, the generation of noise can be optimized, as a result.

In particular, the lowest characteristic frequency is set to a value below 600 Hz via the modulating element and is set, in particular, to a value far below 600 Hz.

In one embodiment, an additional separating element is provided which is arranged between a holder for the bearing member and the impeller and which has a central opening, through which the bearing member can be acted upon with fluid. The separating element is arranged such that fluid from a high pressure area of the circulating pump can be decoupled. A low pressure area is located in the region around the bearing member. As a result, fluid can be sprayed onto the bearing member. As a result, an effective lubrication is achieved and, in particular, an emergency lubrication is realized when, for example, the fluid to be pumped contains a high proportion of gas.

At least one fluid channel is formed, in particular, between the additional separating element and the holder and at least one opening, which points into a high pressure area of an impeller chamber, is arranged at the additional separating element. As a result, fluid may be coupled out of the high pressure area and sprayed onto the bearing member in order to make an effective lubrication and, in particular, emergency lubrication possible.

In one embodiment, a blade structure is arranged on the rotor. As a result, a difference in pressure may be generated in a rotor chamber as a result of rotation of the rotor and this leads to a mechanical axial force on the rotor. This is oriented in the direction of the stator and causes a holding force component in an axial direction. This holding force component increases the axial holding force for the rotor at the bearing device. In principle, the dynamic pressure during operation of the circulating pump can cause the impeller to lift away from the bearing member, in particular in the case of high discharge heads. This is counteracted by the blade structure at the rotor.

In one embodiment, a first bearing shell, which is mounted on the bearing member, and a second bearing shell, which is mounted on the bearing member, are provided, wherein the first bearing shell is connected non-rotatably to the impeller and the second bearing shell is connected non-rotatably to the rotor. As a result, the rotor may be supported directly on the spherically convex bearing member and the impeller may be supported directly on the spherically concave bearing shell. This can have various advantages depending on the configuration. For example, an additional mechanical holding force for preventing any lifting of the impeller may be generated or the lifting of the impeller may be prevented completely as a result.

The first bearing shell and the second bearing shell are, in particular, arranged at oppositely located pole areas of the bearing member. As a result, the combination consisting of rotor and impeller may, to a certain extent, be clamped to the bearing member.

A section of the shaft element, which is guided through the bearing member, then extends, in particular, between the first bearing shell and the second bearing shell. As a result, a bearing device may be realized which has spaced, oppositely located, spherical sliding surfaces.

It is favorable, in addition, when the shaft element is guided through the first bearing shell and the second bearing shell. As a result, it may be connected non-rotatably to the rotor and the impeller in an effective manner.

In one embodiment, the second bearing shell is supported on the rotor via a spring device. The spring device exerts an additional force in the direction of the stator, i.e., the second bearing shell is tensioned. There is, as a result, an additional mechanical holding force for preventing the lifting of the impeller.

In an alternative embodiment, the first bearing shell is supported on the impeller via a spring device. In this case, a main bearing, via which the rotor is mounted so as to be rotatable, is formed via the second bearing shell and the corresponding pole area of the bearing member. The second bearing shell acts "from below" on the bearing member, i.e., on a pole area which is located opposite the pole area which is in direct contact with the first bearing shell fixed in position on the impeller. Any lifting of the impeller is prevented, as a result. The first bearing shell ensures that the impeller-rotor combination is clamped at the bearing member and supports the system consisting of rotor and impeller during any start, stop and standstill and, in general, in situations, in which the hydraulic force is smaller than the magnetic holding force which acts in the direction of the stator. The spring device facilitates a simple producibility, wherein greater tolerances are made possible.

It may be provided for a seal to be arranged in the recess between a wall of the recess and the shaft element. The seal can, in principle, be arranged on the shaft element and, in particular, rotate with it or it can be arranged on the wall of the recess and the shaft element can rotate contrary to it. A mixed form is also possible, with which the seal can be entrained by the shaft element and, in this respect, rotate with a rotary speed which is, on average, less than the rotary speed of the shaft element. The rotor chamber may be additionally sealed by such a seal; no fluid can then pass into the rotor chamber from the impeller chamber or the lubrication chamber through a gap between the wall of the recess and the shaft element.

It is also possible for the concave bearing shell to have a sealing area in relation to the recess for the shaft element. As a result, an impeller chamber is separated from the rotor chamber in a fluid-tight manner via the bearing shell. Fluid from the impeller chamber, which is used for the lubrication of the bearing unit, is prevented from passing into the recess and, therefore, into the rotor chamber. Accordingly, the bearing shell has an inner edge which has a sealing effect. This inner edge periphery area is lubricated at the most incompletely. It can, however, be subject to wear and tear only at a contact surface on the convex bearing member and forms, as a result, a terminal element which is adequately sealed in the direction of the recess.

The following description of preferred embodiments serves to explain the invention in greater detail in conjunction with the drawings.

DETAILED DESCRIPTION OF THE INVENTION

Figure 1:
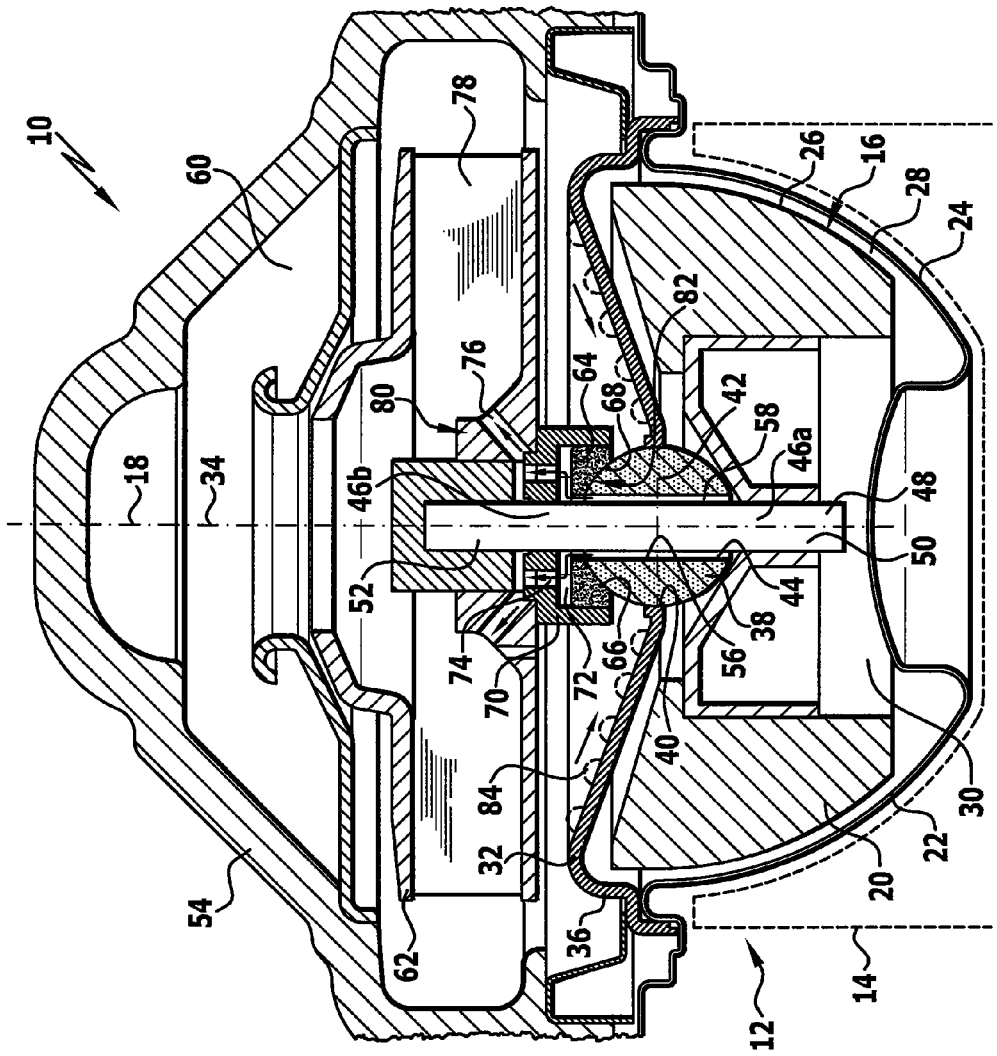
FIG. 1 shows a schematic sectional illustration of a first embodiment of a circulating pump according to the invention.

The embodiment of a circulating pump according to the invention, which is shown in FIG. 1 in a schematic sectional illustration and designated as 10, comprises an electric motor 12 with a stator 14 and a rotor 16. The rotor 16 can be turned (rotated) about an axis of rotation 18.

The rotor 16 generates, in particular, a magnetic field. The rotor 16 comprises for this purpose one or more magnetic elements 20 and, in particular, permanent magnet elements. The stator 14 comprises one or more coil windings (not shown in the drawings). For example, a magnetic field which changes with respect to time is generated at the stator 14 and, as a result, the magnetic force between the rotor 16 and the stator 14 changes, whereby the rotary movement of the rotor 16 is driven.

A separating cap 22 is associated with the stator 14 and the rotor 16 and this separates the stator 14 from the rotor 16 in a fluid-tight manner. The separating cap 22 has a spherical area 24. It has, for example, the shape of a cut-off spherical shell.

The rotor 16 is likewise of a spherical design with a spherical area 26 which faces the spherical area 24 of the separating cap 22. A gap 28 (gap of air) is located between the spherical area 26 of the rotor 16 and the separating cap 22.

The rotor 16 is rotatable in a rotor chamber 30, wherein the rotor chamber 30 is located in an interior space of the separating cap 22.

The rotor chamber 30 is limited upwards by a separating element 32. The separating element 32 is supported on the separating cap 22 and, for example, connected to it. In this respect, a seal in the shape, for example, of an O-ring can, as will be explained in greater detail below, be arranged on the supporting area of the separating element 32 against the separating cap 22.

The rotor chamber 30 is designed to be rotationally symmetric to an axial axis 34 of the circulating pump 10. When the rotor 16 is not inclined, the axis of rotation 18 coincides with the axial axis 34.

The separating element 32 is designed as a holder 36 for a spherically convex bearing member 38. For this purpose, the holder 36 comprises an opening 40 which lies concentrically to the axial axis 34. The bearing member 38 is seated in this opening. The bearing member 38 is, in particular, a bearing ball which is produced, for example, from a ceramic material. It is held in the opening 40 of the separating element 32 in an equatorial plane 42.

The bearing member 38 has a (central) recess (opening) 44 which extends between poles 46a, 46b which are located opposite one another (in relation to the equatorial plane 42).

A shaft element 48 is guided through the recess 44. This shaft element 48 is, in particular, of a cylindrical design. The recess 44 is of a hollow cylindrical design. The shaft element 48 is connected non-rotatably to the rotor 16 via a connecting area 50. It has an area which is located in the recess 44. It projects beyond the recess 44 with an additional area 52.

The bearing member 38 is held non-rotatably by the holder 36 in relation to a housing 54 of the circulating pump 10. The shaft element 48 is guided through the recess 44 so as to be rotatable. During a rotation of the rotor 16 relative to the stator 14 (and, therefore, also relative to the housing 54) the area of the shaft element 48 located in the recess 44 rotates relative to the recess 44 about the axis of rotation 18.

A gap 58 is formed between a wall 56 of the recess 44 and the shaft element 48. The shaft element 48 has, in this respect, an external diameter which is smaller than the internal diameter of the recess 44. A width of the gap 58 is predetermined by the difference between this internal diameter and this external diameter.

The width of the gap is selected in one embodiment such that the shaft element 48 does not touch the wall 56 and the rotor 16 strikes beforehand in the maximum possible or admissible inclined position of the rotor 16 relative to the axial axis 34 of the shaft element 48. Further on, a variation will be explained in conjunction with FIG. 11, with which the shaft element has a recessed area.

The width of the gap 58 is, in particular, at least 0.5 mm.

An impeller chamber 60 is formed above the rotor chamber 30, limited by the housing 54. An impeller 62 is arranged for rotation in this impeller chamber 60, wherein an axis of rotation of the impeller 62 is the axis of rotation 18.

The impeller 62 is connected non-rotatably to the area 52 of the shaft element 48.

In addition, a bearing shell 64, which has a spherically convex area 66, is seated non-rotatably on the impeller 62. The bearing shell 64 is placed on the bearing member 38 with this convex area 66 in the region of the pole 46b.

The bearing shell 64 is produced, for example, from graphite.

The shaft element 48 passes through the bearing shell 64 by way of a corresponding recess.

The bearing shell 64 is of a spherical design in the concave area 66 (hollow spherical section). The concave area 66 forms a spherical sliding surface 68.

The bearing shell 64 is connected non-rotatably to the impeller 62 by means of a connecting element 70 which comprises, for example, the bearing shell 64. An annular channel 72 is formed between a base of the connecting element 70 and the bearing shell 64 and this extends as far as the area 52 of the shaft element 48.

One or more channels 74, which are aligned at least approximately parallel to the axial axis 34, open into the annular channel 72. These channels 74 are connected to one or more channels 76 which open into a hollow space 78 of the impeller 62.

Flow paths are provided by the annular channel 72 and the channels 74, 76, through which fluid can flow along the sliding surface 68 into the hollow space 78. As a result, a lubrication chamber 80 is provided. The bearing member 38 with the bearing shell 64 forms a bearing device 82, via which the rotor 16 is mounted for rotation relative to the stator 14. The bearing device 82 may be lubricated via the lubrication chamber 80 by way of fluid to be pumped which is intended to be conveyed by the circulating pump 10.

The separating element 32 separates the rotor chamber 30 from the lubrication chamber 80. The impeller chamber 60 is separated from the rotor chamber 30 via the separating element 32. When fluid is conveyed via rotation of the impeller 62, the fluid is not pumped through the gap 28. As a result, the problem is avoided of magnetic particles being able to settle in the gap 28 and lead to a blockage.

The conveyance of lubricant through the lubrication chamber 80 is brought about solely through the impeller chamber 60 without participation of the rotor chamber 30.

In principle, fluid can enter the recess 44 via the annular channel 72 in the case of the circulating pump 10. Since the fluid is, however, at the same level of pressure as the fluid in the gap 28, a reduced number of magnetic particles can, as a result, pass into the rotor chamber 30.

The separating element 32 is produced from a heat-conductive material and in particular, from a metallic material in order to be able to discharge heat from the stator 14 via the rotor chamber 30 into the impeller chamber 60 and, from there, by means of fluid to be pumped.

In a variation of one embodiment, the separating element 32 is provided with a rib structure 84 which faces the impeller chamber 60. The rib structure 84 increases the surface area of the separating element 32 and, therefore, the heat discharging surface area. It is also possible for a rib structure to be arranged in the direction of the rotor chamber 30.

In principle, it is favorable when the gap 28 is filled with fluid in order to make a greater transfer of heat to the separating element 32 possible. For example, the rotor chamber 30 is filled beforehand (for example, with a mixture of water and glycol).

The solution according to the invention functions as follows:

The rotor 16 is driven by an electric motor by way of the electromagnetic interaction with the stator 14 when this is acted upon with current. It rotates about the axis of rotation 18. The impeller 62 is connected non-rotatably to the rotor 16 via the shaft element 48 and so the impeller 62 is driven by the rotation of the rotor and, as a result, a difference in pressure in relation to the conveyance of fluid is generated.

The rotor 16 is mounted for rotation via the bearing device 82. The shaft element 48 passes through the bearing member 38. The bearing member 38 is located between the bearing shell 64 and the connecting area 50 to the rotor 16. The rotor 16 is supported on the bearing device 82 to a certain extent from above. This support "from above" is made possible by the shaft element 48 which passes through the bearing member 38.

As a result, it is possible to separate the rotor chamber 30 from the lubrication chamber 80 in a fluid-tight manner via the separating element 32 or at least separate them such that magnetic particles (which can be contained in the fluid to be pumped) are prevented from passing into the rotor chamber 30. As a result of the separating element 32, the lubrication chamber 80 is in direct effective fluid contact with the impeller chamber 60 and is not in direct effective fluid contact with the rotor chamber 30. Lubricant (fluid to be pumped) need not, as a result, flow in the gap 28.

At least an "uninhibited" flow of fluid to be pumped (lubricant) through the gap 28 is no longer possible. As a result, magnetic particles can no longer be deposited on the rotor 16 or this deposit is prevented to a considerable extent.

The rotor 16 and the bearing device 82 form a combination. In the case of any replacement of the rotor, the entire combination consisting of rotor and bearing device is exchanged.

Lubricant flows through the lubrication chamber 80 and, in this respect, follows the difference in pressure generated as a result of rotation of the impeller 62. In FIG. 1, the flow of lubricant is indicated by arrows. This flow of lubricant avoids the rotor chamber 30.

Figure 2:
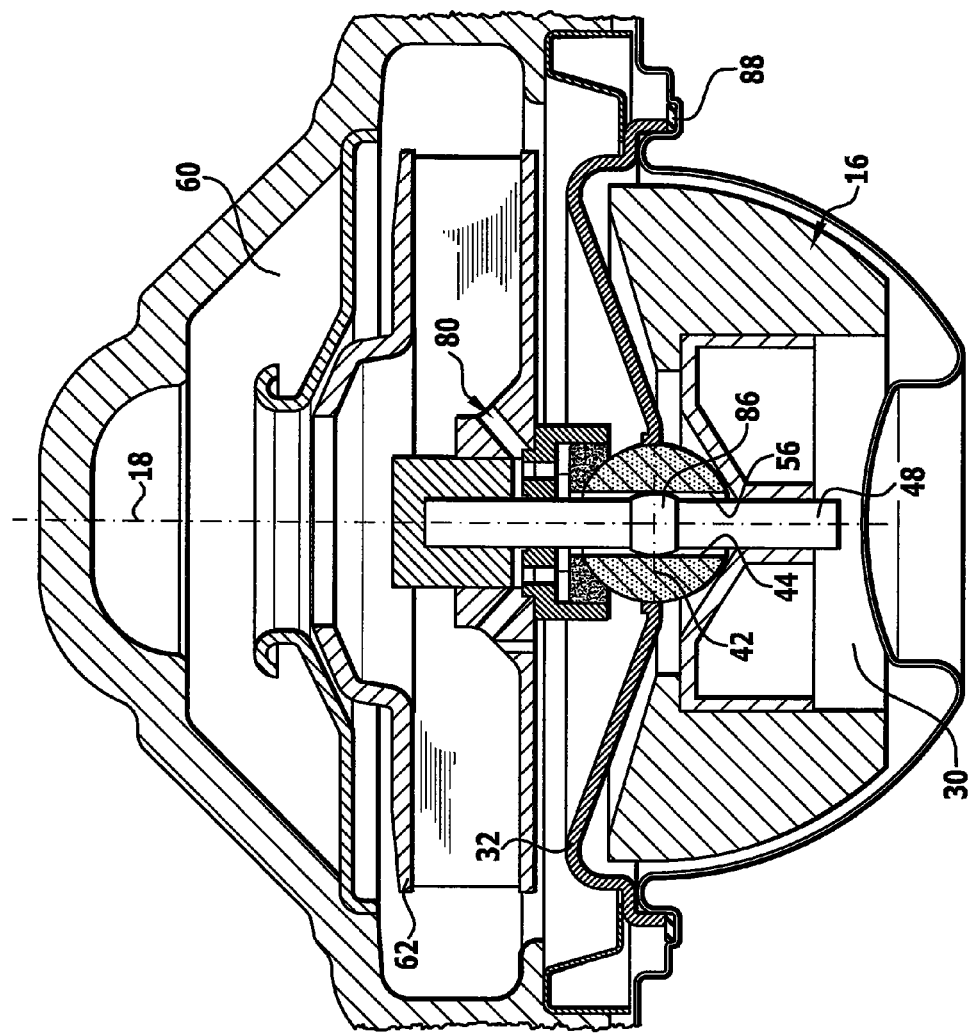
FIG. 2 shows a variation of the embodiment according to FIG. 1.

In one variation of the circulating pump 10 which is shown schematically in FIG. 2 in a sectional view, wherein the same reference numerals are used for the same elements, a seal 86 is arranged in the recess 44 between the wall 56 and the shaft element 48 and interrupts the flow of fluid to be pumped (and, therefore, also of lubricant) from the lubrication chamber 80 or from the impeller chamber 60 to the rotor chamber 30 completely.

In the embodiment shown, the seal 86 is arranged on the shaft element 48, for example, in the vicinity of the equatorial plane 42. The seal 86 is designed such that a rotation of the shaft element 48 about the axis of rotation 18 is possible, wherein it rotates with the shaft element 48 and, in particular, is arranged non-rotatably on it.

When a complete fluid-tightness of the rotor chamber 30 is intended to be achieved, the separating element 32 is also preferably arranged in relation to the separating cap 22 via a seal 88, for example, in the form of an O-ring in order to make a through flow of fluid in this area impossible.

In order to obtain a good discharge of heat during operation of the corresponding circulating pump, the gap 28 and all the other intermediate spaces in the rotor 16 are preferably filled beforehand with a fluid, such as, for example, a mixture of water and glycol.

Figure 3:
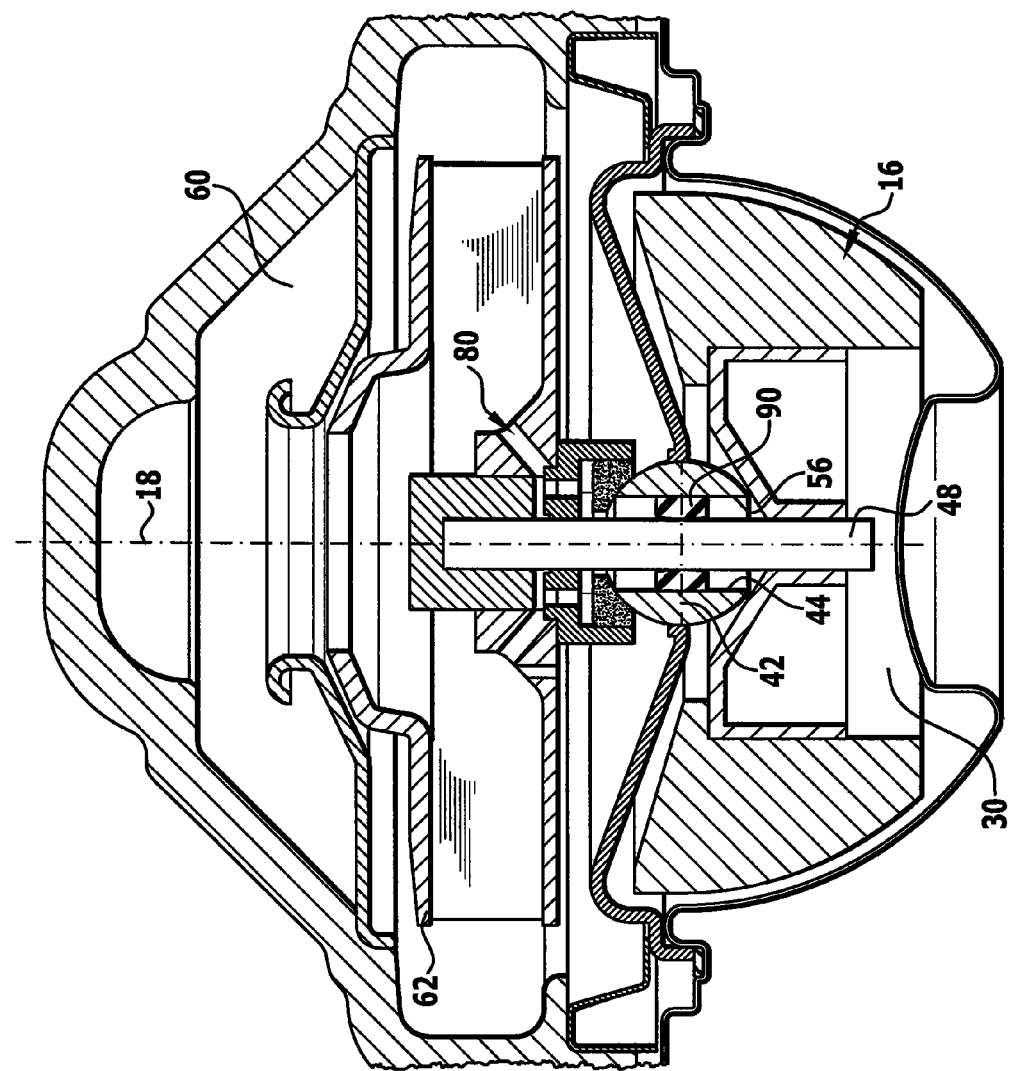
FIG. 3 shows a further variation of the embodiment according to FIG. 1.

In another variation, which is shown schematically in FIG. 3, a stationary seal 90 is arranged in the recess 44 and is fixed to the wall 56. The shaft element 48 rotates relative to this seal 90.

The circulating pumps according to FIGS. 2 and 3 otherwise function like the circulating pump according to FIG. 1.

Figure 4:
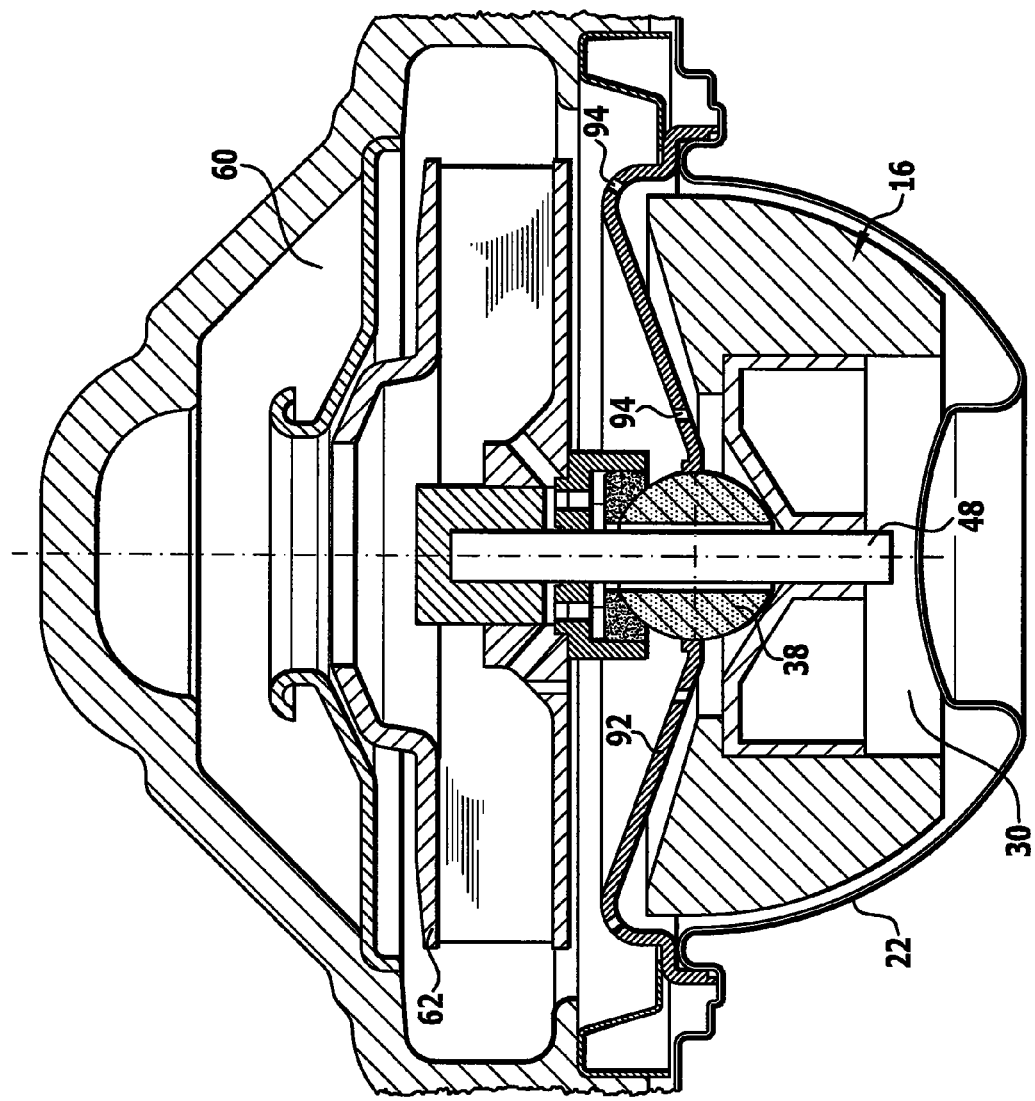
FIG. 4 shows a further variation of the embodiment according to FIG. 1.

In a further variation of the circulating pump 10 which is shown schematically in FIG. 4, wherein the same reference numerals are used for the same elements, a separating element 92 is provided instead of the separating element 32, which is arranged and designed to be fluid-tight, and this separating element 92 has one or more openings 94 from the impeller chamber 60 into the rotor chamber 30. The openings 94 have a diameter which is small enough so that magnetic particles with a specific critical size cannot pass into the rotor chamber 30. For example, the diameter of such an opening 94 is at the most 0.3 mm large and, in particular, this diameter is at the most 0.2 mm. An opening 94 is produced, for example, by way of laser machining.

It is possible for fluid to be pumped to enter the rotor chamber 30 and, therefore, for this to be filled with fluid to be pumped (first filling) through an opening 94. As a result, an improved cooling effect is achieved in order to allow a better discharge of heat from the rotor 16. In addition, it is not necessary for the rotor chamber 30 to be filled beforehand at the works.

The opening or openings 94 are preferably arranged where the difference in pressure between the impeller chamber 60 and the rotor chamber 30 is minimized. For example, one or several openings 94 are arranged in the vicinity of the bearing member 38.

It is also possible for a larger opening to be arranged at the separating element 92, at which a filter element is then arranged which filters out larger magnetic particles (for example, with a size of 0.2 mm or more).

Otherwise, the circulating pump functions as described above.

Figure 5:
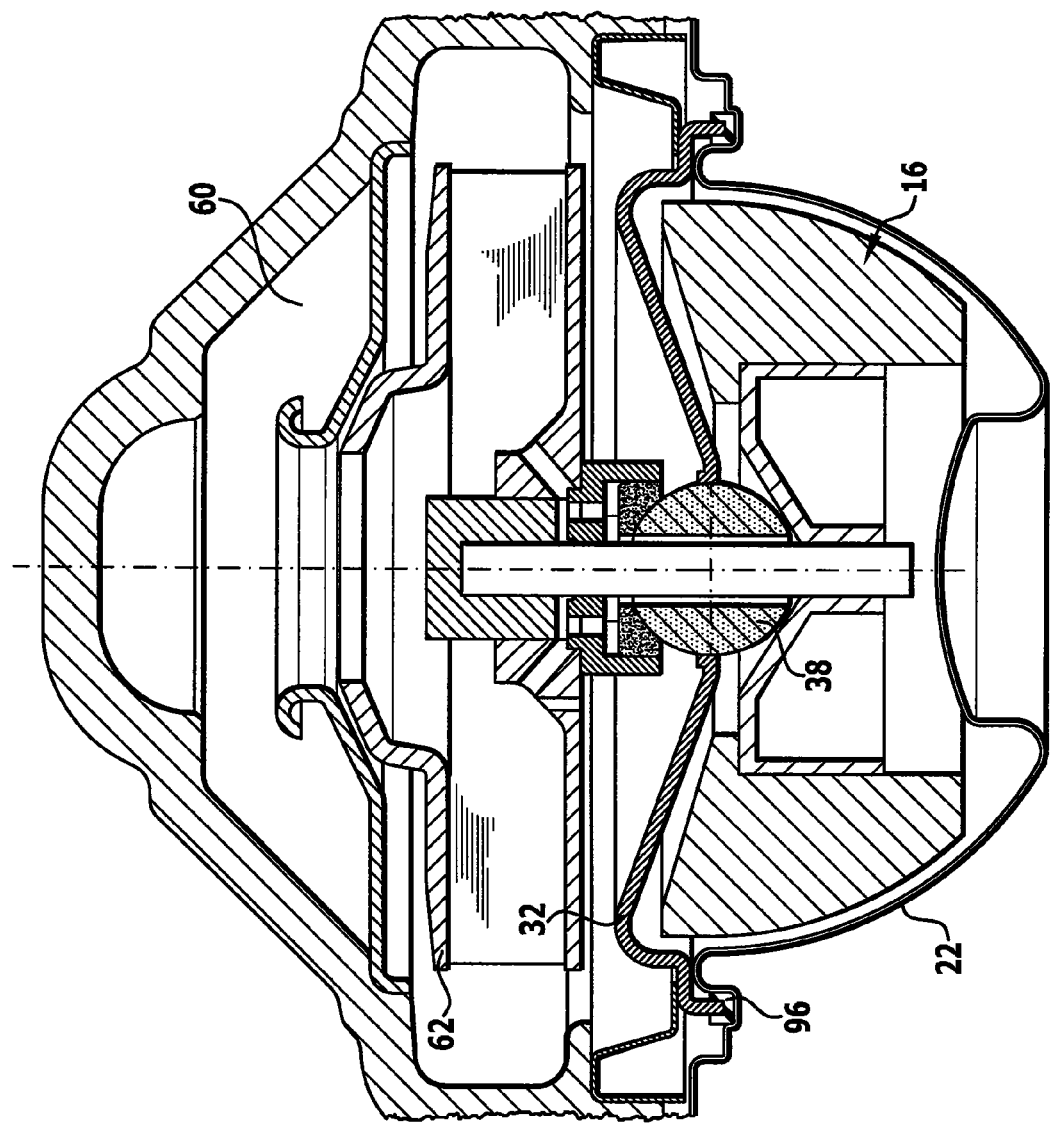
FIG. 5 shows a further variation of the circulating pump according to FIG. 1.

In a further variation of the circulating pump 10 which is shown schematically in FIG. 5, the separating element 32 is mounted on the separating cap 22 via a modulating element 96 or is arranged directly on the stator 14. The modulating element 96 serves to modulate the characteristic frequencies of the rotating system consisting of rotor 16 and impeller 62. The modulating element 96 is, for example, an annular rubber bearing. It serves to decouple and, in particular, decouple the separating element 32 from the stator 14 with respect to vibration.

An optimization of noise generation may be achieved by selecting the modulating element 96 accordingly. For example, a main characteristic frequency may be set in a frequency range considerably below 600 Hz.

In this respect, it is, in principle, possible to also modulate the characteristic frequencies by designing the separating element 92 accordingly. For example, the separating element 92 can be reinforced by ribs.

The characteristic frequency spectrum of the circulating pump 10 can be modulated by the modulating element 96 in a targeted manner and be brought into a desired range at least with respect to the strongest characteristic mode.

Figure 6:
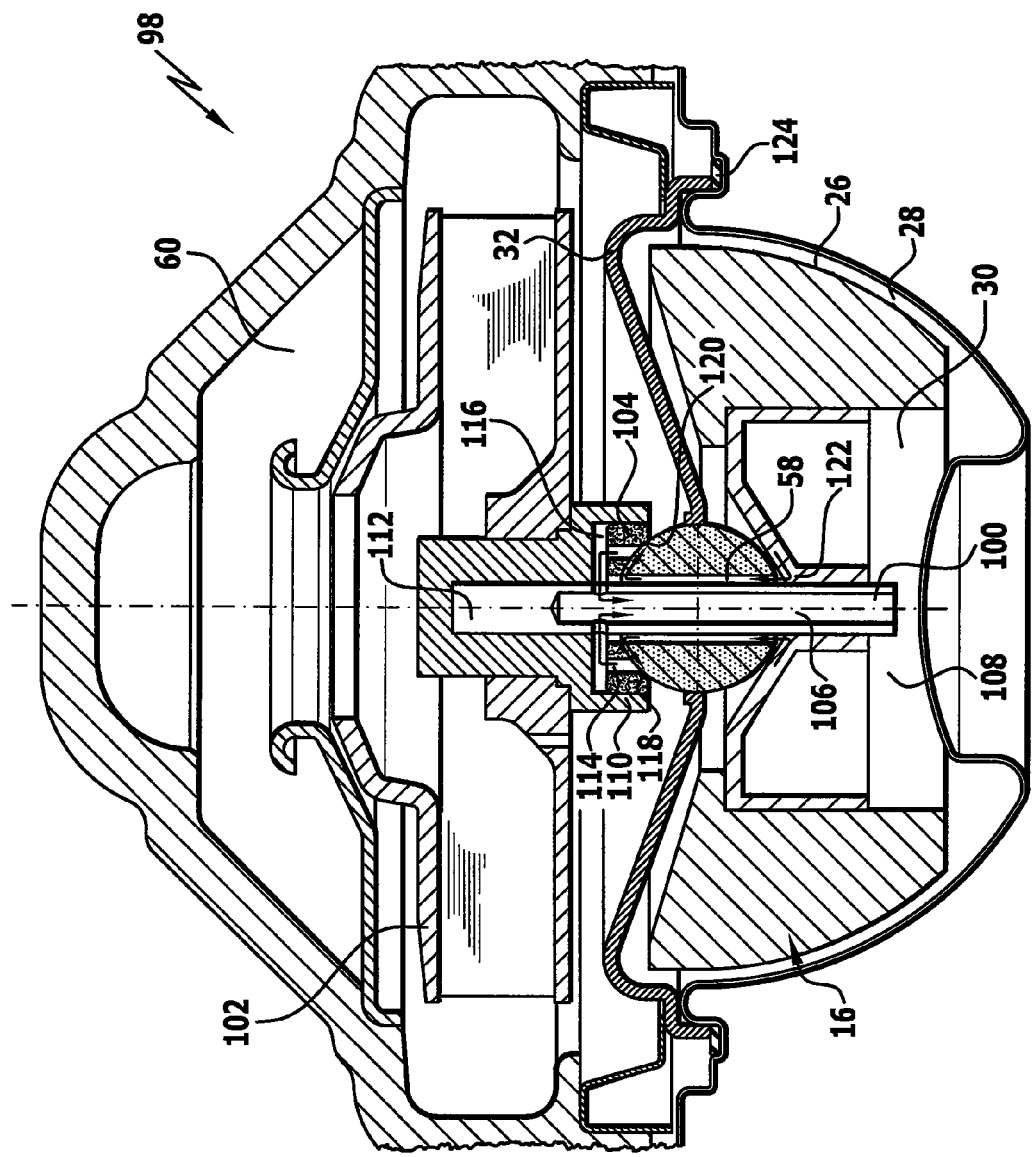
FIG. 6 shows a schematic sectional view of a second embodiment of a circulating pump according to the invention.

A second embodiment of a circulating pump according to the invention, which is shown schematically in a sectional view in FIG. 6 and designated as 98, comprises a stator and a rotor which are, in principle, of the same construction as in the circulating pump 10. The same reference numerals are used for the same elements. Again, a bearing device is provided with a bearing member 38 which has a continuous recess 44. This bearing member 38 is held via a holder 36 which separates a rotor chamber 30 from an impeller chamber 60 and, in particular, separates them in a fluid-tight manner.

A shaft element 100 is guided through the recess 44 and this is connected non-rotatably to the rotor 16. The shaft element 100 is, in addition, connected non-rotatably to an impeller 102, wherein the arrangement is, in principle, the same as that described in conjunction with the circulating pump 10.

The corresponding bearing device comprises a concave bearing shell 104 which is placed on the bearing member 38.

A channel 106 is arranged at the shaft element 100 which is parallel to a direction of longitudinal extension of the shaft element 100. The shaft element 100 has a hollow cavity in the area of the channel 106.

The channel 106 opens into the rotor chamber 30, wherein it opens into a hollow space 108 which is part of the rotor chamber 30.

The bearing shell 104 is, on the other hand, held on the impeller 102 via a connecting element 110. The connecting element 110 is designed such that a lubrication chamber 112 for the fluid lubrication of the corresponding bearing device is not in effective fluid communication with the impeller chamber 60.

One or more channels 114 are arranged in the bearing shell 104 and these are oriented at least approximately axially. They open in one direction into a surface area of the bearing shell 104, with which this is placed on the bearing member 38. At their other end, the channel or channels 114 open into an annular chamber 116, wherein the annular chamber is, on the other hand, in effective fluid communication with the channel 106 in the shaft element 100. Instead of an annual chamber 116, a plurality of channels can also be provided which connect the channel 106 of the shaft element 100 to the channel or channels 114.

The bearing shell 104 has a spherical area 118 which is arranged between the impeller chamber 60 and an opening area of the channel or channels 114. This spherical area 118 is designed such that the channel or channels 114 are separated with respect to the impeller chamber 60 so as to be fluid-tight, i.e., the spherical area 118 is designed as a sealing area.

Furthermore, the bearing shell 104 has a spherical area 120 which extends between the opening area of the channel or channels 114 and the gap 58 between the recess 44 and an outer contour of the shaft element 100. A flow path for fluid to be pumped as lubricant is formed via this spherical area 120.

The gap 28 between the recess 44 and the outer contour of the shaft element 100 opens into an area 122 of the rotor chamber 30. As a result, lubricating fluid can pass from the rotor chamber 30 into the gap 58.

The lubrication chamber 112 is decoupled from the impeller chamber 60. An "internal lubrication" of the bearing device may be realized which is separate from the transport of the medium to be pumped.

A friction pump is formed in the rotor chamber 30 via the rotating rotor 16. For this purpose, the separating element 32 is sealed via a seal 124 so that no exchange of fluid with the impeller chamber 60 can take place.

The friction pump results in the region of the gap 58 in a pressure $p_1$ which is greater than a pressure $p_2$ in the hollow space 108. As a result, lubricant (fluid) is moved. This passes through the gap 28 into the recess 44 and via the spherical area 120 and the channel or channels 114 into the annular chamber 116. It then flows through the channel 106 into the hollow space 108. The hollow space 108, on the other hand, is in effective fluid communication with the gap 58. This results in a flow circuit, in which lubricating fluid is transported between the bearing shell 104 and the bearing member 38, wherein no exchange with the impeller chamber 60 can take place as a result of the design of the spherical area 118.

As a result, magnetic particles can also be prevented from passing into the rotor chamber 30 or abrasive particles from passing into the lubrication chamber.

In order to form this internal lubricant circuit, a first filling with, for example, a mixture of water and glycol is necessary.

Otherwise, the circulating pump 98 functions like the circulating pump 10.

Figure 7:
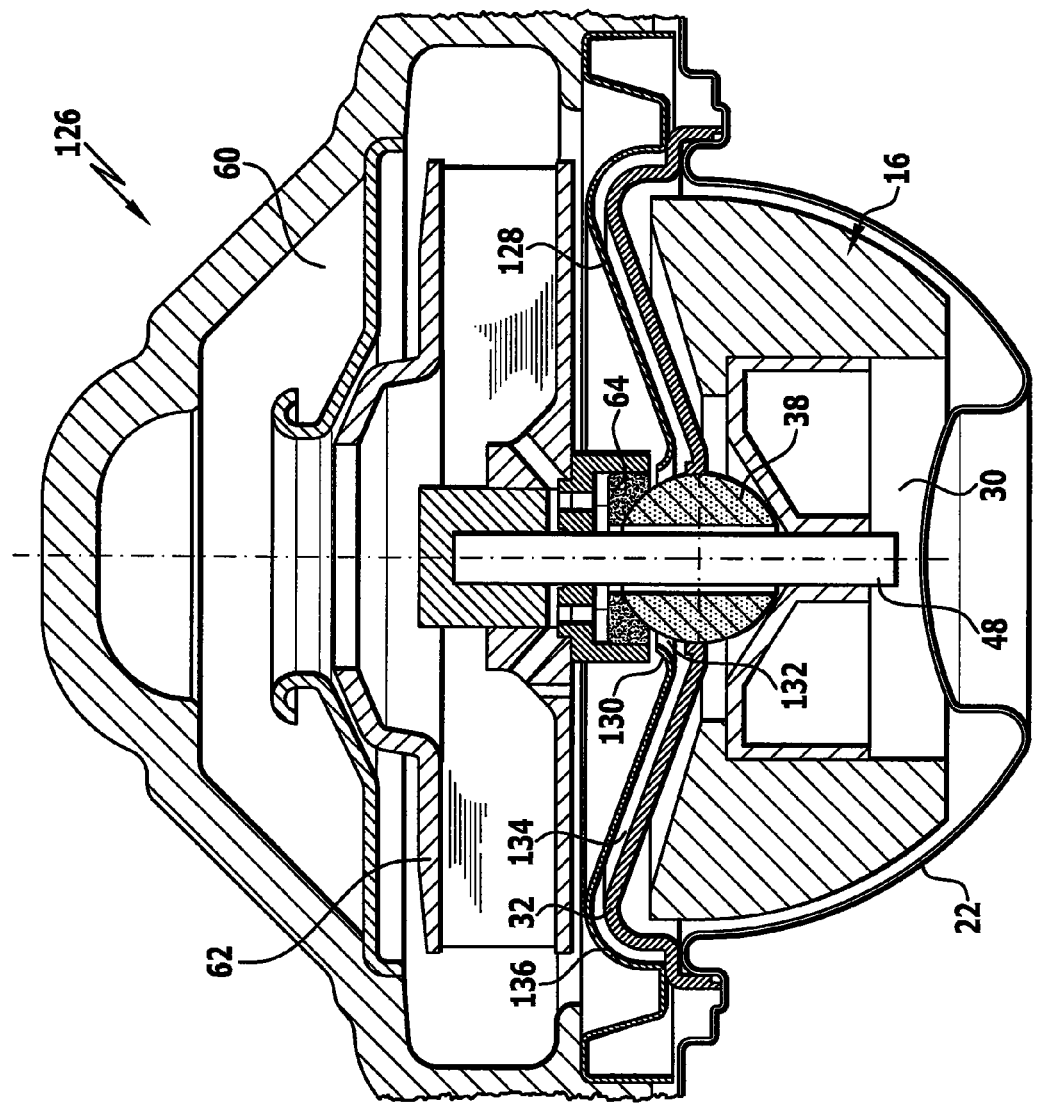
FIG. 7 shows a schematic sectional view of a third embodiment of a circulating pump according to the invention.

A third embodiment of a circulating pump according to the invention, which is shown schematically in FIG. 7 in a sectional illustration and designated as 126, is, in principle, of the same design as the circulating pump 10. The same reference numerals are used for the same elements.

An additional separating element 128, for example in the form of a separating plate, is arranged above the separating element 32. This additional separating element 128 follows the separating element 32 in its shape, wherein it does not touch the bearing member 38. In the area of the bearing member 38, the separating element 128 has an area 130 which encloses the bearing member 38. The area 130 thereby encloses a central opening 132 of the separating element 128, via which the bearing member 38 can be acted upon and, in particular, can be sprayed with fluid.

One fluid channel 134 (at least) is formed between the additional separating element 128 and the separating element 32 (which forms the holder for the bearing member 38). In particular, the intermediate space between the separating element 128 and the separating element 32 forms a continuous fluid channel.

One or more openings 136, via which an effective fluid connection between the at least one fluid channel 134 and the impeller chamber 60 is achieved, are arranged in the separating element 128 in an outer area. Fluid to be pumped can pass into the at least one fluid channel 134 via the opening or openings 136.

The opening 136 is arranged in an area, in which the pressure in the fluid to be pumped is greater than around the bearing member 38. As a result, as mentioned above, the bearing member 38 can be acted upon directly with fluid to be pumped between the bearing shell 104 and the connecting area to the separating element 32. As a result, an emergency lubrication may be realized or the lubrication of the corresponding bearing device may be improved. Lubrication may also be realized when the fluid to be pumped contains a high proportion of gas since fluid to be pumped can be sprayed on as lubricant.

Otherwise, the circulating pump 126 functions like the circulating pump 10.

Figure 8:
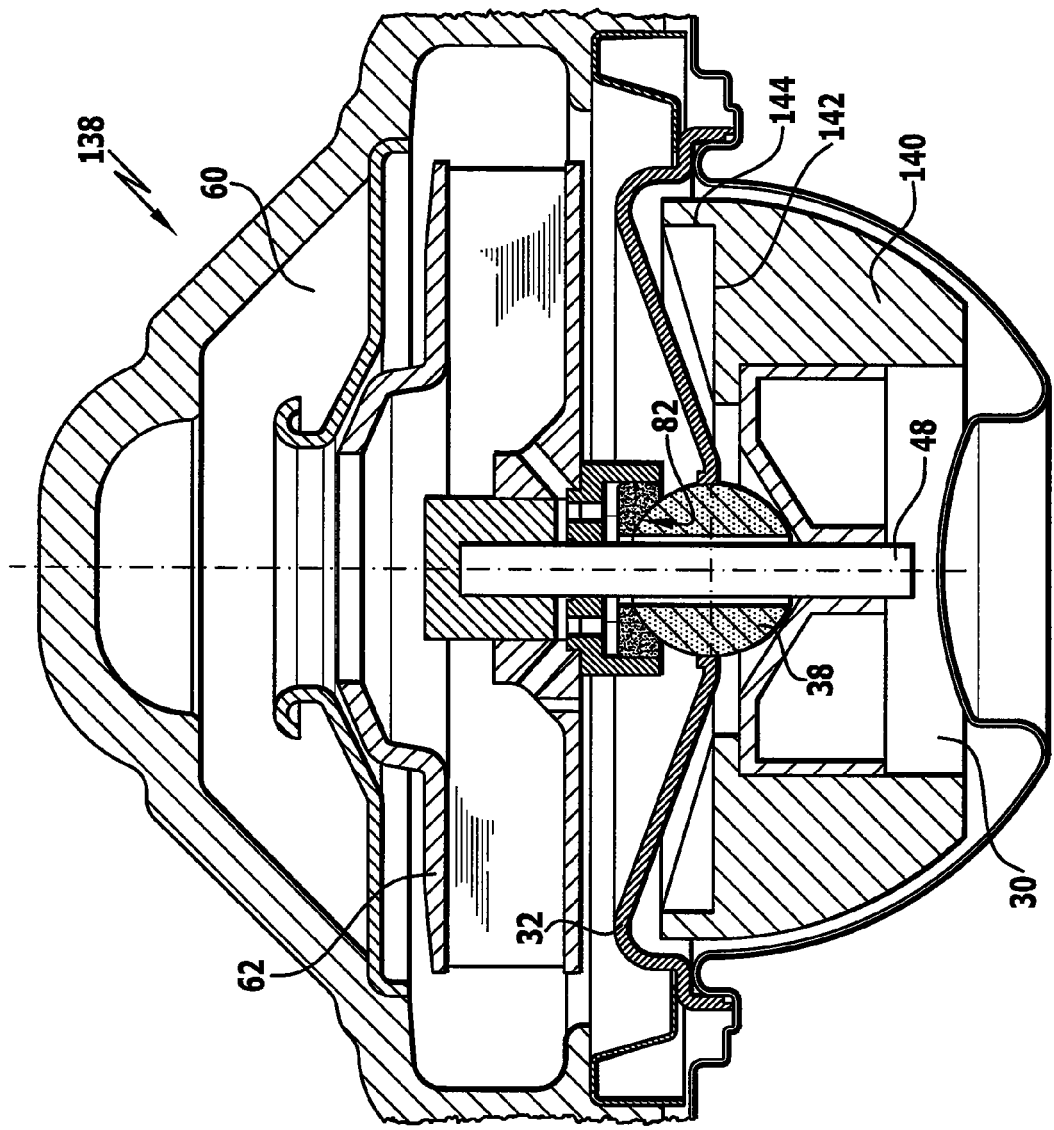
FIG. 8 shows a schematic sectional view of a fourth embodiment of a circulating pump according to the invention.

A fourth embodiment of a circulating pump according to the invention, which is shown schematically in FIG. 8 and designated as 138, is, in principle, of the same design as the circulating pump 10. The same reference numerals are used for the same elements.

The circulating pump 138 differs from the circulating pump 10 in the design of the rotor. A rotor 140 is provided which has an area 142 with a blade structure 144. The blade structure 144 is arranged below the separating element 32 and faces it.

The blade structure 144 comprises a plurality of vane profiles or ribs which rotate with the rotation of the rotor 140 in the rotor chamber 30. The corresponding profiles are designed such that the blade structure 144 influences an axial force which acts on the combination consisting of impeller 62 and rotor 140.

As a result of the rotation of the impeller 62 in the impeller chamber 60, fluid to be pumped exerts an axially acting hydraulic force on the impeller 62 which is directed away from the stator 14. This force has the tendency to lift the bearing shell 64 away from the bearing member 38. In the case of greater discharge heads, there is, in principle, the risk of the impeller 62 lifting away.

Fluid is located in hollow cavities of the rotor 140 which are interconnected in an effective fluid manner. In this respect, this may be fluid to be pumped which enters gradually during operation and provides for the filling or it may be a prior filling. As a result of the blade structure 144 on the rotor 140, an increase in pressure is brought about in the rotor chamber 30 and this generates a holding force component in an axial direction, wherein this axial force acts on the stator 14. As a result, a mechanical holding force, which reduces the risk of lifting, is generated via the rotor blades in addition to the magnetic holding force between the rotor 16 and the stator 14 (and, in particular, an iron portion of the stator 14).

Otherwise, the circulating pump 138 functions as described above.

Figure 9:
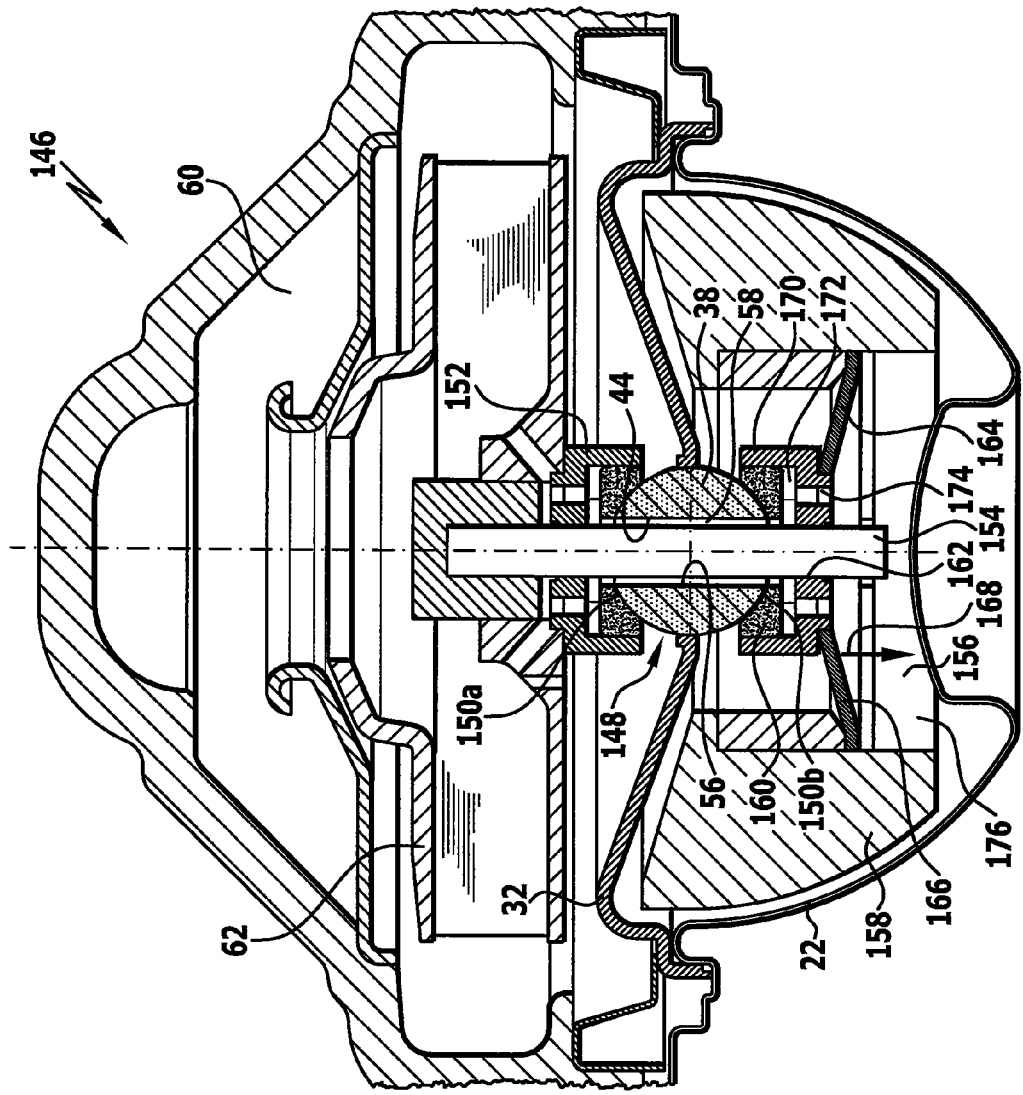
FIG. 9 shows a schematic sectional view of a fifth embodiment of a circulating pump according to the invention.

A fifth embodiment of a circulating pump according to the invention, which is shown schematically in FIG. 9 in a sectional illustration and designated as 146, comprises a bearing device 148 with a convex bearing member. The same reference numerals are used for the same elements as those of the circulating pump 10. The bearing member is, therefore, designated as 38. A spherically concave first bearing shell 152 is mounted on the bearing member 38 at a first pole area 150a. The first bearing shell 152 is positioned in an impeller chamber 60 which is, in principle, of the same design as the impeller chamber 60 of the circulating pump 10. An impeller 62 rotates in this impeller chamber 60.

The bearing member 38 has a recess, through which a shaft element 154 is guided which is connected non-rotatably to the impeller 62.

The impeller chamber 60 is separated from a rotor chamber 156, in which a rotor 158 is arranged for rotation. A separating element 32 which corresponds to the separating element 32 of the circulating pump 10 separates the rotor chamber 156 from the impeller chamber 60. It also holds the convex bearing member 38.

A spherically concave second bearing shell 160 is arranged in the rotor chamber 156 and is supported on a second pole area 150b of the convex bearing member 38. The first pole area 150a and the second pole area 150b are located axially opposite one another.

The shaft element 154 passes through a recess 162 of the second bearing shell 160 and is connected non-rotatably to the rotor 158.

The second bearing shell 160 is supported on the rotor 158 by a spring device 164. The spring device 164 is formed, in particular, by a plate spring 166 or by a set of plate springs. Plate springs have the advantage that their characteristic line can be set in a defined manner.

The spring device 164 is designed such that it exerts a tensioning force on the second bearing shell 160 in an axial direction towards the stator (not shown in FIG. 9). The direction of the force is indicated in FIG. 9 by the reference numeral 168.

The second bearing shell 160 is held non-rotatably on the rotor 158 by a connecting element 170. The connecting element 170 is designed, for example, in the shape of a beaker and the second bearing shell 160 is fixed in position in an interior space of the connecting element 170. An annular channel 172 is formed between the connecting element 170 and a rear side of the second bearing shell 160 which faces away from a spherical area of the second bearing shell and the annular channel is in effective fluid communication with the gap 28 between the shaft element 154 and the wall 56 of the recess 44.

One or more channels 174 lead from the annular channel 172 through the connecting element 170 into a hollow cavity 176 of the rotor chamber 156. As a result, the annular channel 172 is in effective fluid communication with the rotor chamber 156.

The first bearing shell 152 which is of a concave design has a spherical sliding surface, via which it is mounted on the spherically convex bearing member 38. Fluid to be pumped serves as lubricant for this bearing, wherein the lubricant path is the same as that described in conjunction with the circulating pump 10.

The second bearing shell 160 likewise has a concave spherical sliding area, with which it is seated on the second pole area 150b of the convex spherical bearing member 38. This bearing is lubricated by fluid from the rotor chamber 156 as lubricant which can flow in a flow path through the gap 28.

The spring device 164 is set such that it exerts a tensioning force in the direction of the stator which is, for example, in the order of magnitude of 10 N. This tensioning force is part of an axial holding force which prevents any lifting of the impeller 62 in the case of great discharge heads. As a result of the provision of an elastic spring device 164, the bearing member 38 is not securely "rigidly" clamped between the first bearing shell 152 and the second bearing shell 160 but rather an axial flexibility is realized. As a result, the installation is made easier and the tolerance requirements for the production of the circulating pump 146 are reduced.

Figure 10:
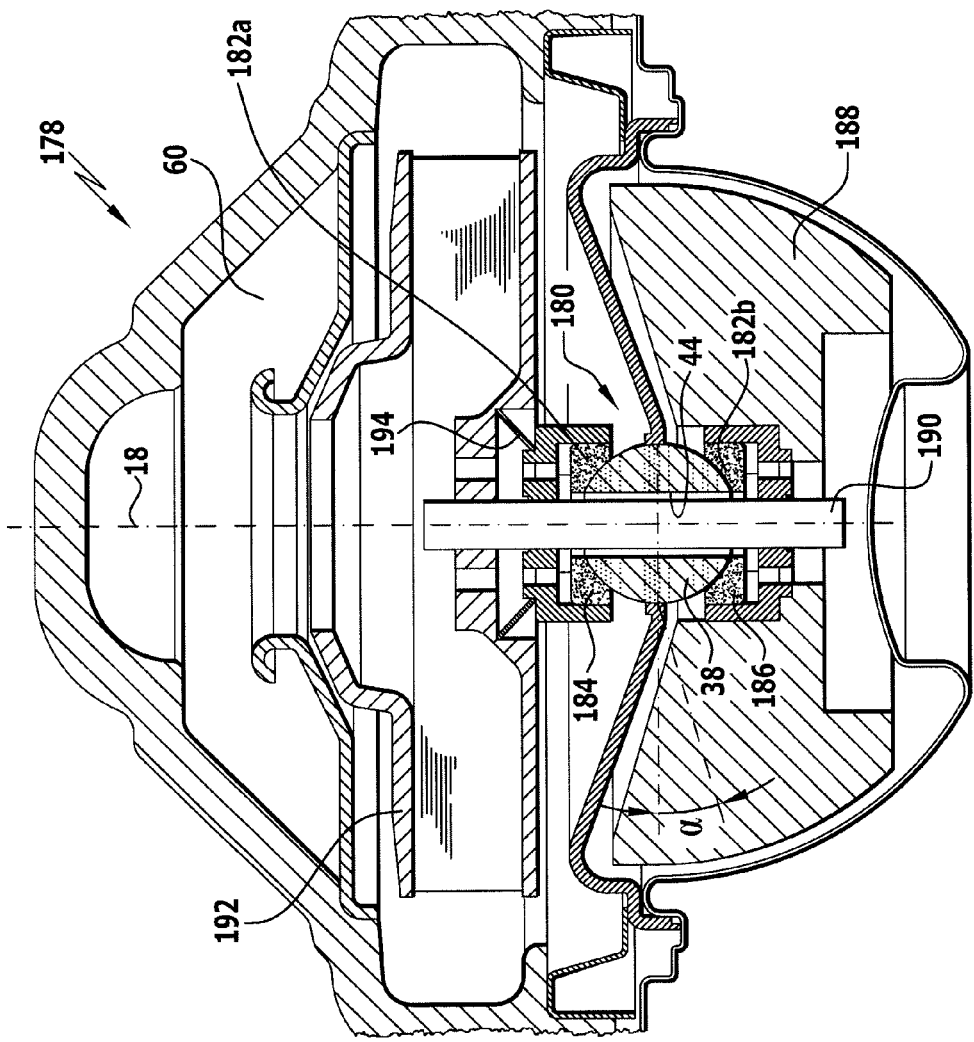
FIG. 10 shows a schematic sectional view of a sixth embodiment of a circulating pump according to the invention.

A sixth embodiment of a circulating pump according to the invention, which is shown schematically in FIG. 10 in a sectional illustration and designated as 178, comprises a bearing device 180 with a spherical bearing member 38, on which a first concave bearing shell 184 is placed in a first pole area 182a. A concave second bearing shell 186, which slides on the bearing member 38, is arranged at an oppositely located second pole area 182b.

The second bearing shell 186 is connected non-rotatably to a rotor 188. A shaft element 190 is connected non-rotatably to the rotor 188 and is guided through a recess 44 in the bearing member 38, is guided through the first bearing shell 184 and connected non-rotatably to an impeller 192. The impeller is, on the other hand, rotatable in an impeller chamber 60.

The first bearing shell 184 is connected non-rotatably to the impeller 192. The first bearing shell 184 is supported on the impeller 192 via a spring device 194. The spring device 194 comprises, in particular, a plate spring or a set of plate springs. The distance between the first bearing shell 184 and the impeller 192 can be varied via the elastic spring device 194.

The mounting of the rotor 188 via the second bearing shell 186 on the convex bearing member 38 forms a main bearing for the rotatable mounting of the rotor 188. Any lifting of the impeller 192 relative to the rotor 188 is prevented by this support "from below". The mounting via the first bearing shell 184 exerts a counterforce which axially fixes the position of the rotor 188 and, therefore, also the position of the impeller 192. The system consisting of rotor 188 and impeller 192 may be borne via the bearing which is formed by means of the first bearing shell 184 and the bearing member 38 in situations, in which the hydraulic force is smaller than the magnetic holding force. The magnetic holding force acts in the direction of the stator 14. This is particularly relevant during any start, stop and standstill.

The part bearing, which is formed via the second bearing shell 186 and the second pole area 182b of the bearing member 38, prevents any lifting of the impeller 192 in an axial direction completely. As a result, a mechanical securing against lifting is realized and so a magnetic holding force for preventing the lifting is no longer necessary.

A magnetic holding force is proportional to the sinus β between a radial direction at right angles to the axis of rotation 18 and the effective direction of the magnetic holding force which is, on the other hand, determined by the interaction between the stator and the rotor 188 (the stator is not shown in FIG. 10). Since the main bearing mentioned above provides for the axial holding force, the angle β can, in principle, be selected to be optionally small.

The torque is proportional to cos β. When the angle β is selected to be small, a high torque is obtained.

High torques can, therefore, be realized as a result of the circulating pump 178, wherein the impeller 192 is secured against lifting.

The rotor 188 and, therefore, the impeller 192, too, is axially fixed via the "counter mounting" by means of the first bearing shell 184. The spring device 194 enables the installation to be made easier and the tolerance requirements to be kept low.

The lubrication of the bearing device 180 is brought about, in principle, via fluid which can be made available to sliding surfaces of the bearing device 180 through corresponding channels and gaps.

Figure 11:
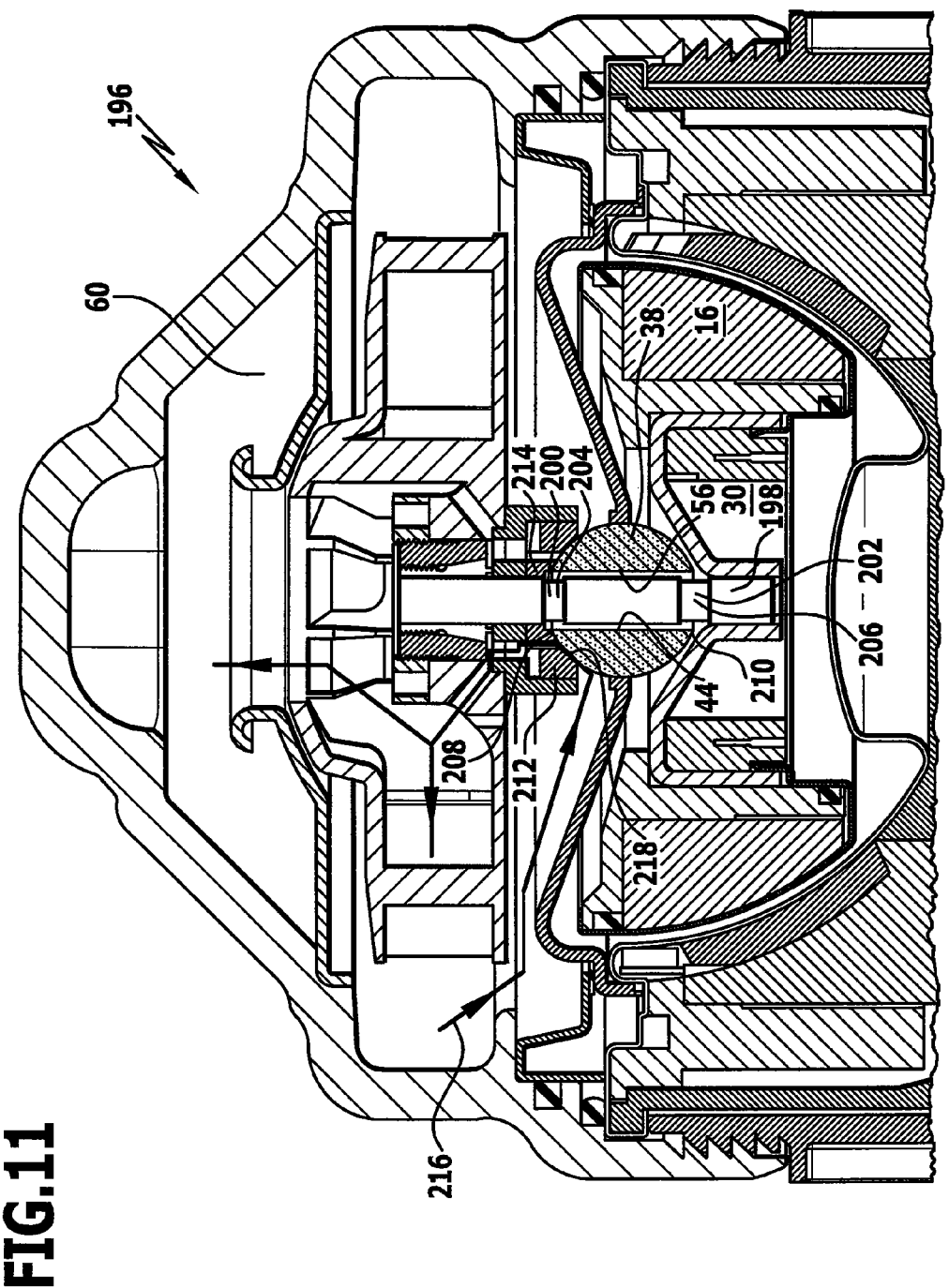
FIG. 11 shows a further variation of the embodiment according to FIG. 1.

A variation of the circulating pump 10, which is shown schematically in FIG. 11 and designated as 196, comprises a shaft element 198 which has recessed areas 200, 202 which are axially spaced. The recessed areas 200, 202 are formed by annular recesses which are coaxial to an axis of the shaft element 198. In the region of the recessed areas 202, the shaft element 198 has a smaller external diameter than outside the recessed areas 202 (and, in particular, smaller than in that part of the shaft element 198 which is located between the recessed areas 200 and 202).

The shaft element 198 exits from the bearing member 38 in respective exit areas 204 and 206. The recess 44 at the bearing member 38 has respective annular edges 208, 210.

The recessed areas 200, 202 are each arranged at the exit areas 204, 206 of the shaft element 108 so as to be located opposite the edges 208 and 210, respectively.

The bearing member 38 is particularly sensitive to impact at the edges 208, 210, particularly when it is a ceramic member. As a result of the recessed areas 200, 202, the shaft element 198 is prevented from striking the edges 208, 210, which are sensitive to impact, during tilting of the rotor 16.

It is possible for the shaft element 198 to successfully strike the wall 56 of the recess 4 in an area which is spaced sufficiently from the edges 208, 210.

In this embodiment, which can also be used in all the other circulating pumps described, a limitation of the tilting of the rotor 60 by the shaft element 198 striking within the recess 44 is possible.

In a variation of one embodiment, a bearing shell 212 is provided (FIG. 11) which has an edge area 214 towards the recess 44 which has a sealing effect in relation to the recess 44. As a result, fluid from the impeller chamber cannot pass into the recess 44 and, therefore, into the rotor chamber 30.

The bearing shell 212 slides on the bearing ball 38 via this edge area 214 (inner edge). This edge area 214 can wear out only on the spherical contact surface on the bearing member 38. When no lubrication or along a minimum lubrication is present, it also forms a relatively tight terminating element towards the recess 44 and, therefore, towards the rotor chamber 30.

The edge area 214 forms a continuous area for the purpose of the fluid-tight delimitation of the rotor chamber 30 in relation to the impeller chamber 60 at the recess 44.

A flow path 216 for fluid to be pumped as lubricant for the corresponding bearing device is shown schematically in FIG. 11. The lubricant flows between the bearing ball 38 and an outer area of the bearing shell 212 into one or more channels 218. The edge area 214 provides for a seal in relation to the recess 44.

Otherwise, the circulating pump 196 functions as described above.

The invention claimed is:

1. A circulating pump, comprising:
   a stator;
   a rotor;
   a bearing device with a convex bearing member and at least one concave bearing shell;
   wherein the rotor is mounted for rotation via said bearing shell; and
   an impeller connected non-rotatably to the rotor;
   wherein a shaft element is connected non-rotatably to the rotor and non-rotatably to the impeller;
   wherein the shaft element is guided through the bearing member and is rotatable relative to the bearing member; and
   wherein the bearing member is arranged between a bearing shell fixed to the impeller and a fixing area of the shaft element on the rotor.

2. The circulating pump as defined in claim 1, wherein the bearing member has a recess, the shaft element being positioned in said recess.

3. The circulating pump as defined in claim 2, wherein the shaft element has a greatest external diameter smaller than a smallest internal diameter of the recess.

4. The circulating pump as defined in claim 2, wherein the shaft element has a recessed area with a reduced diameter in the region of an exit area through the recess.

5. The circulating pump as defined in claim 1, wherein the shaft element is designed to be cylindrical in at least one section.

6. The circulating pump as defined in claim 1, wherein the bearing member is held non-rotatably by a holder arranged above the rotor facing the impeller.

7. The circulating pump as defined in claim 1, comprising a rotor chamber, the rotor being arranged in said chamber so as to be rotatable, and an impeller chamber, the impeller being arranged in said chamber so as to be rotatable, wherein the rotor chamber and the impeller chamber are separated from one another by a separating element.

8. The circulating pump as defined in claim 7, wherein the separating element is arranged at the level of the bearing member.

9. The circulating pump as defined in claim 7, wherein the separating element is designed as a holder for the bearing member.

10. The circulating pump as defined in claim 7, wherein the bearing shell connected non-rotatably to the impeller and mounted on the bearing member is arranged between the separating element and the impeller with respect to an axial direction.

11. The circulating pump as defined in of claim 7, wherein the separating element decouples the rotor chamber from a lubrication chamber of the bearing device, fluid for lubrication during operation of the circulating pump being transported through said bearing device.

12. The circulating pump as defined in claim 7, wherein the separating element is designed to be fluid-tight or at the most have openings between the impeller chamber and the rotor chamber with a diameter of at the most 0.3 mm.

13. The circulating pump as defined in claim 7, wherein the separating element has a rib structure.

14. The circulating pump as defined in claim 7, wherein at least one seal is arranged between the separating element and a separating cap surrounding the rotor.

15. The circulating pump as defined in claim 7, wherein the rotor chamber is previously filled with fluid.

16. The circulating pump as defined in claim 1, comprising a lubrication chamber for the bearing device separated with respect to fluid from an impeller chamber, the impeller rotating in said chamber.

17. The circulating pump as defined in claim 16, wherein the shaft element has at least one channel, fluid being able to flow via said channel from the lubrication chamber to a rotor chamber, the rotor rotating in said chamber.

18. The circulating pump as defined in claim 16, wherein the at least one bearing shell is sealed in the direction of the impeller chamber.

19. The circulating pump as defined in claim 17, wherein the at least one bearing shell has channels, fluid flowing through a gap at the bearing member and the shaft element being suppliable via said channels to the at least one channel of the shaft element.

20. The circulating pump as defined in claim 16, wherein a friction pump driving a flow of lubricant in the lubrication chamber is formed by the rotor rotating in the rotor chamber.

21. The circulating pump as defined in claim 1, wherein a holder for the bearing member is mounted on a rubber element for the characteristic frequencies of the rotating system.

22. The circulating pump as defined in claim 21, wherein the lowest characteristic frequency is set to below 600 Hz via the rubber element.

23. The circulating pump as defined in claim 7, comprising an additional separating element arranged between a holder for the bearing member and the impeller and having a central opening, the bearing member being acted upon with fluid through said opening.

24. The circulating pump as defined in claim 23, wherein at least one fluid channel is formed between the additional separating element and the holder and at least one opening is formed at the additional separating element, said opening pointing into a high pressure area of an impeller chamber.

25. The circulating pump as defined in claim 1, wherein a blade structure is arranged on the rotor.

26. The circulating pump as defined in claim 1, comprising a first bearing shell mounted on the bearing member and a second bearing shell mounted on the bearing member, wherein the first bearing shell is connected non-rotatably to the impeller and the second bearing shell is connected non-rotatably to the rotor.

27. The circulating pump as defined in claim 26, wherein the first bearing shell and the second bearing shell are supported at oppositely located pole areas of the bearing member.

28. The circulating pump as defined in claim 26, wherein a section of the shaft element guided through the bearing member extends between the first bearing shell and the second bearing shell.

29. The circulating pump as defined in claim 26, wherein the shaft element is guided through the first bearing shell and the second bearing shell.

30. The circulating pump as defined in claim 26, wherein the second bearing shell is supported on the rotor via a spring device.

31. The circulating pump as defined in claim 30, wherein the spring device exerts an additional force in the direction of the stator.

32. The circulating pump as defined in claim 26, wherein the first bearing shell is supported on the impeller via a spring device.

33. The circulating pump as defined in claim 2, wherein a seal is arranged in the recess between a wall of the recess and the shaft element.

34. The circulating pump as defined in claim 2, wherein the at least one bearing shell has a sealing area in relation to the recess for the shaft element.

35. A circulating pump, comprising:
a stator;
a rotor;
a bearing device with a convex bearing member and at least one concave bearing shell;
wherein the rotor is mounted for rotation via said bearing shell; and
an impeller connected non-rotatably to the rotor;
wherein a shaft element is connected non-rotatably to the rotor and non-rotatably to the impeller;
wherein the shaft element is guided through the bearing member and is rotatable relative to the bearing member;
wherein the bearing member has a recess, the shaft element being positioned in said recess; and
wherein the shaft element has a recessed area with a reduced diameter in the region of an exit area through the recess.

36. A circulating pump, comprising:
a stator;
a rotor;
a bearing device with a convex bearing member and at least one concave bearing shell;
wherein the rotor is mounted for rotation via said bearing shell;
an impeller connected non-rotatably to the rotor; and
a rotor chamber, the rotor being arranged in said chamber so as to be rotatable, and an impeller chamber, the impeller being arranged in said chamber so as to be rotatable, wherein the rotor chamber and the impeller chamber are separated from one another by a separating element;
wherein a shaft element is connected non-rotatably to the rotor and non-rotatably to the impeller;
wherein the shaft element is guided through the bearing member and is rotatable relative to the bearing member; and
wherein the bearing shell connected non-rotatably to the impeller and mounted on the bearing member is arranged between the separating element and the impeller with respect to an axial direction.

37. A circulating pump, comprising:
a stator;
a rotor;
a bearing device with a convex bearing member and at least one concave bearing shell;
wherein the rotor is mounted for rotation via said bearing shell;
an impeller connected non-rotatably to the rotor; and
a rotor chamber, the rotor being arranged in said chamber so as to be rotatable, and an impeller chamber, the impeller being arranged in said chamber so as to be rotatable, wherein the rotor chamber and the impeller chamber are separated from one another by a separating element;

wherein a shaft element is connected non-rotatably to the rotor and non-rotatably to the impeller;

wherein the shaft element is guided through the bearing member and is rotatable relative to the bearing member; and wherein at least one seal is arranged between the separating element and a separating cap surrounding the rotor.

38. A circulating pump, comprising:

a stator;

a rotor;

a bearing device with a convex bearing member and at least one concave bearing shell;

wherein the rotor is mounted for rotation via said bearing shell;

an impeller connected non-rotatably to the rotor; and a lubrication chamber for the bearing device separated with respect to fluid from an impeller chamber, the impeller rotating in said chamber;

wherein a shaft element is connected non-rotatably to the rotor and non-rotatably to the impeller;

wherein the shaft element is guided through the bearing member and is rotatable relative to the bearing member;

wherein the shaft element has at least one channel, fluid being able to flow via said channel from the lubrication chamber to a rotor chamber, the rotor rotating in said chamber.

39. A circulating pump, comprising:

a stator;

a rotor;

a bearing device with a convex bearing member and at least one concave bearing shell;

wherein the rotor is mounted for rotation via said concave bearing shell;

an impeller connected non-rotatably to the rotor; and a first bearing shell mounted on the bearing member and a second bearing shell mounted on the bearing member, wherein the first bearing shell is connected non-rotatably to the impeller and the second bearing shell is connected non-rotatably to the rotor;

wherein a shaft element is connected non-rotatably to the rotor and non-rotatably to the impeller;

wherein the shaft element is guided through the bearing member and is rotatable relative to the bearing member.

40. A circulating pump, comprising:

a stator;

a rotor;

a bearing device with a convex bearing member and at least one concave bearing shell;

wherein the rotor is mounted for rotation via said bearing shell;

an impeller connected non-rotatably to the rotor; and wherein a shaft element is connected non-rotatably to the rotor and non-rotatably to the impeller;

wherein the shaft element is guided through the bearing member and is rotatable relative to the bearing member;

wherein the bearing member has a recess, the shaft element being positioned in said recess;

wherein the at least one bearing shell has a sealing area in relation to the recess for the shaft element.

* * * * *